(12) United States Patent
Englisch et al.

(10) Patent No.: US 7,264,571 B2
(45) Date of Patent: Sep. 4, 2007

(54) METHOD AND APPARATUS FOR CONTROLLING A VEHICLE POWER TRAIN CONTAINING A CONTINUOUSLY VARIABLE TRANSMISSION

(75) Inventors: Andreas Englisch, Bühl (DE); André Linnenbrügger, Bühl (DE); Michael Reuschel, Ottersweier (DE)

(73) Assignee: LuK Lamellen und Kupplungsbau Betiligungs KG, Bühl (DE)

( * ) Notice: Subject to any disclaimer, the term of this patent is extended or adjusted under 35 U.S.C. 154(b) by 175 days.

(21) Appl. No.: 11/165,777

(22) Filed: Jun. 25, 2005

(65) Prior Publication Data
US 2005/0288146 A1 Dec. 29, 2005

(30) Foreign Application Priority Data
Jun. 25, 2004 (DE) .................. 10 2004 030 739

(51) Int. Cl.
*F16H 6/662* (2006.01)

(52) U.S. Cl. ...................................................... 477/48
(58) Field of Classification Search ................ 477/107, 477/110, 47, 48, 37, 43
See application file for complete search history.

(56) References Cited

U.S. PATENT DOCUMENTS

| 6,579,206 | B2 * | 6/2003 | Liu et al. ....................... 477/43 |
| 6,909,953 | B2 * | 6/2005 | Joe et al. ....................... 701/51 |
| 6,945,905 | B2 * | 9/2005 | Tamai et al. .................... 477/3 |

* cited by examiner

*Primary Examiner*—Dirk Wright
(74) *Attorney, Agent, or Firm*—Alfred J. Mangels

(57) ABSTRACT

A method and apparatus to save fuel and to make efficient use of the possibilities of a power train including a transmission having a continuously variable transmission ratio. If the vehicle velocity exceeds a prescribed velocity the fuel supply to the engine is shut off, kinetic energy of the vehicle is stored in an energy storage device, and the transmission ratio of the transmission is shifted in the direction of a lower transmission ratio. If those measures are not sufficient the vehicle brakes are operated.

13 Claims, 2 Drawing Sheets

METHOD AND APPARATUS FOR CONTROLLING A VEHICLE POWER TRAIN CONTAINING A CONTINUOUSLY VARIABLE TRANSMISSION

BACKGROUND OF THE INVENTION

1. Field of the Invention

The invention concerns a method for controlling a vehicle power train containing a combustion engine and a continuously variable transmission, in particular under constant or decreasing vehicle velocity.

2. Description of the Related Art

Automatic transmissions, in particular transmissions a continuously variable transmission ratio, belt-driven conical-pulley transmissions, for example, are enjoying increasing popularity in motor vehicles. They not only allow improved driving comfort, but they also make reductions of fuel consumption possible, since the combustion engine is operated at the slowest possible speed, dependent on the power demand.

The object of the invention is to further reduce fuel consumption of such power trains as well as to reduce to a minimum the need for operating the brake pedal.

A first solution of that object is achieved through a method for controlling a vehicle power train containing a combustion engine and a continuously variable transmission, wherein the transmission ratio of the transmission and the power delivered by the combustion engine are controlled depending on the momentary vehicle velocity and a requested propulsive power. As the actual velocity of the vehicle increases over a desired velocity, the transmission ratio of the transmission is changed in the direction of maximum transmission ratio, and as the power decreases further the quantity of fuel fed to the engine is decreased.

Advantageously, during deceleration, the quantity of fuel fed to the engine is reduced to zero.

Also preferred is that when velocity increases and greater propulsive power is not requested, kinetic energy of the vehicle is loaded into an energy storage device by means of a recouperation unit positioned in the power train.

In a further embodiment of the method according to the invention, the transmission ratio of the transmission is changed in the direction of a lower transmission ratio when the vehicle velocity increases during an overrun condition while the fuel supply is shut off.

Also preferred is to carry out the method in such a way that a vehicle brake is activated when the actual velocity increases while the transmission is shifted in the direction of a lower transmission ratio.

A further solution of the object on which the invention is based is achieved with a method for controlling a vehicle drive train containing a combustion engine and a continuously variable transmission, wherein the transmission ratio of the transmission is controlled in such a way that the combustion engine runs at a desired speed that depends on the momentary vehicle velocity and the requested propulsive power. The fuel supply to the combustion engine is interrupted if the combustion engine is running at a speed that is higher than a target speed. According to the present invention, the desired target speed is increased depending on predetermined operating conditions. As a result, the fuel supply can remain shut off over a greater operating range.

For example, the desired engine speed can be increased when deceleration fuel cutoff is activated, if the transmission is not shifted to its lowest transmission ratio.

Alternatively, or in addition, the desired engine speed can be increased if a vehicle brake is activated.

Also preferred is for the increase of the desired engine speed to be canceled more quickly when the requested propulsive power is increased than when the activation of the brake is ended.

The amount by which the desired engine speed is increased depends advantageously on operating parameters of the power train.

It is also advantageous to limit the gradients of the change to the desired engine speed.

A further solution of the object of the invention is achieved with an apparatus for controlling a vehicle drive train containing a combustion engine and a continuously variable transmission, which includes sensors for detecting at least the position of an accelerator pedal, the vehicle velocity, and the transmission ratio of the transmission, actuators for adjusting a power setting element of the combustion engine, the transmission ratio of the transmission and the supply of fuel to the combustion engine, and a control unit which controls the actuators depending on output signals from the sensors to carry out at least one of the above-mentioned procedures.

BRIEF DESCRIPTION OF THE DRAWINGS

The invention will be described below on the basis of schematic drawings in exemplary form and with additional details.

DESCRIPTION OF THE PREFERRED EMBODIMENTS

Figure 1:
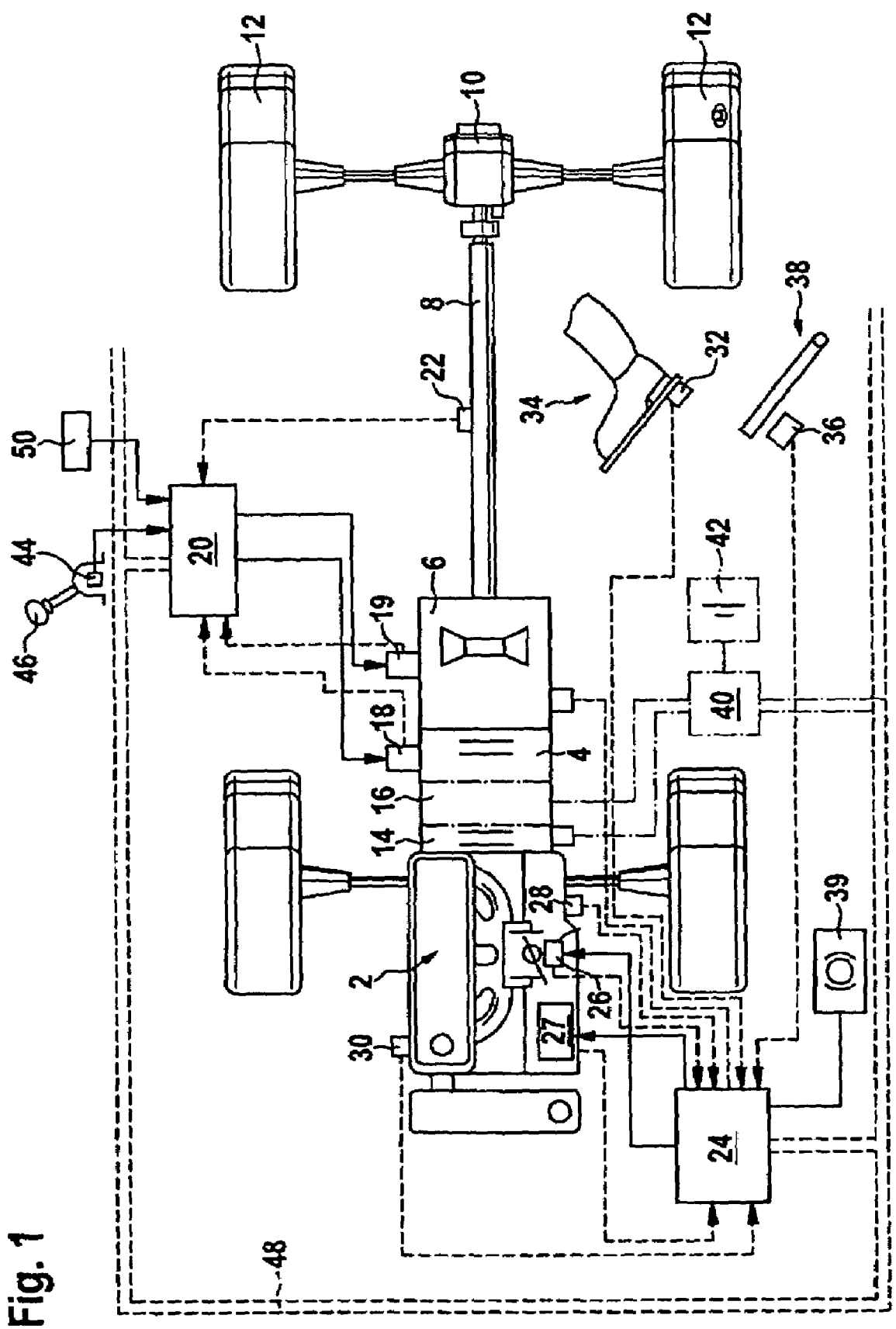
FIG. 1 shows a known power train of a motor vehicle.

According to FIG. 1, a vehicle power train contains a combustion engine 2 which is connected through a clutch 4 and an automatic transmission 6 having continuously variable transmission ratio, advantageously a belt-driven conical-pulley transmission, to a drive shaft 8 which drives rear wheels 12 of a motor vehicle through a differential 10. Accordingly, the power train can also be designed as a front wheel power train or as an all-wheel power train.

Optionally, positioned between combustion engine 2 and clutch 4 is an additional clutch 14, which is connected with clutch 4 through a starter/generator 16.

An actuator 18 is provided to operate the clutch 4, and an actuator 19 to adjust the transmission ratio of the transmission 6. Actuators 18 and 19 are controlled by a transmission controller 20, which is connected to a sensor 22 for the speed of the drive shaft and to sensors, not shown in detail, for detecting the momentary position of clutch 4 and the momentary transmission ratio of the transmission 6.

To control the combustion engine 2 there is an engine controller 24 which operates an actuator 26 for a power setting element of the combustion engine, and an actuator 27 for interrupting the fuel supply, and which is connected to a sensor 28 for the speed of the crankshaft, a sensor 30 for the coolant temperature, a sensor for the position of the power setting element and possibly additional sensors. In addition, the engine controller 24 is connected to a sensor 32 for detecting the position of an accelerator pedal 34 and a sensor 36 for detecting actuation of a brake pedal 38. In addition, the engine controller has an output whereby the vehicle brake system 39 may be actuated. A data bus that is present in the vehicle may also be used advantageously to control the brake system, if both controllers are connected to it.

The starter/generator 16 and the clutch 14, which is normally closed and is only opened if the motor vehicle is to travel propelled solely by starter/generator 16, are controlled by an electrical controller 40, which also determines whether energy from the starter/generator 16 is fed into a battery 42, or whether the starter-generator is supplied with energy from the battery 42.

In addition, the transmission controller 20 is connected to a sensor 44 that detects the position of a selector lever 46, with which an operator of the vehicle selects a driving program.

The controllers 20, 24, and 40 are connected through a bus 48 for data communication. The functions of the controllers can be divided among individual units in various ways. There may be a single controller in an extreme situation.

A velocity controller 50 is connected to the controller 20 with which a desired velocity of the vehicle may be entered.

The construction and functions of the described power trains are known and are therefore not described in detail. Depending on the position of the selector lever 46, the accelerator pedal 34, brake pedal 38, and the momentary vehicle velocity, which is determinable, for example, from the output signal of sensor 32, the position of the power setting element of the combustion engine 2, and the transmission ratio of the transmission 6 are set so that depending on the driver profile the driving style is fuel-economical or sporty, with characteristic diagrams and programs being stored with which a particular desired speed of the combustion engine may be matched to a driving profile, so that the combustion engine runs at a speed such that with increasing actuation of the accelerator pedal a momentary increase of power is possible.

The clutch 14 is only disengaged when the vehicle is to be operated solely with electric motor power. The clutch 4 is a start-up clutch, which is activated precisely in a predetermined way when driving off from a standstill. To start the combustion engine, the clutch 4 is disengaged and the clutch 14 is engaged.

A problem with vehicles equipped with automatic transmissions, especially automatic transmissions having a continuously variable setting, is that when the accelerator is deactivated the braking effect of the combustion engine is utilized inadequately, since when the accelerator is deactivated or the accelerator pedal is activated less, the transmission normally shifts to a higher transmission ratio, with the result that while the position of the power setting element remains the same the combustion engine delivers less power. The result is that particularly when operating the vehicle with a velocity control system with which a desired velocity may be set, or when driving at a controlled interval behind a vehicle in front, where the velocity of the leading vehicle is essentially the desired velocity of the following vehicle, because of the inadequate braking ability of the velocity-controlled vehicle its brakes must be operated, which means a loss of convenience for the driver, involves consumption of additional fuel, and increases brake wear.

Regulating strategies will be explained below with which, when the desired velocity is specified and the need for propulsion capacity decreases, the braking ability of the power train is optimized to minimize fuel consumption.

Setting to the highest possible transmission ratio and reducing the fuel supply.

If the need for propulsion capacity decreases or continues to be positive during velocity-controlled operation, for example when the ascending gradient of a road decreases or there is a slight descending gradient, the transmission ratio of the transmission is shifted in the direction of a higher transmission ratio. If, at the highest possible transmission ratio and with the fuel supply reduced, the delivered power is reduced so far by setting back the power setting element that the combustion engine is running only at idle, the fuel supply is entirely interrupted (deceleration fuel cutoff): This operating mode saves fuel and prolongs the life of the combustion engine.

However, the above regulation strategy only works as long as the engine torque at the highest possible transmission ratio is high enough to overcome any increase in the velocity of the vehicle.

Recouperation.

If the above strategy no longer works, i.e., despite the fuel supply being shut off the vehicle velocity increases above the desired velocity, or with interval regulation active the vehicle approaches a leading vehicle, the starter/generator 4 may be used to supply the kinetic energy of the vehicle to the battery 42, which is then available for propulsion if needed. The retarding torque that that makes possible is limited by the performance design of the electrical system and the capacity of the battery.

If even this possibility is not sufficient to prevent an increase of velocity over the desired velocity, a third strategy may be utilized.

Shifting the transmission to a lower transmission ratio, possibly simultaneously with recouperation.

An additional method for building up a greater retarding torque of the power train consists in shifting the transmission in the direction of a lower transmission ratio. The resulting increase in the speed of the combustion engine means dynamically an increased retarding torque as a result of the rotational energy absorbed by the combustion engine, and statically a greater retarding torque as a result of the higher speed of the combustion engine or the higher transmission ratio.

This method works only until the lowest possible transmission ratio is reached and/or the engine cannot turn any faster.

Operating the Brake.

If even the combination of the above-mentioned possibilities—turning off the fuel supply, recouperation, and shifting the transmission ratio to the lowest transmission ratio—are not sufficient to counter an increase in velocity of the vehicle, braking is additionally necessary, with this braking intervention taking place automatically under the control of engine controller 24 or another control unit that is supplied with appropriate data via bus 48. The automatic braking interventions in vehicles are known, for example in the form of an electronic differential lock, an electronic stability program, for example to regulate vehicle dynamics, traction control, a brake assistant to increase brake pressure during emergency braking, a descent control system, in particular for all-terrain vehicles, and a velocity control system with interval sensor and braking intervention.

The above-mentioned automatic brake operation when velocity regulation is active ensures that braking is only utilized under velocity regulation when all of the above-named fuel saving measures are exhausted, so that braking is reduced to a minimum. Active braking intervention under velocity regulation is also particularly advantageous when driving downhill with a trailer.

Driver Notification.

If, despite all of the preceding methods, it should not be possible to maintain the desired velocity, because the maximum braking moments under automatic braking intervention may possibly be limited, it would be conceivable at a certain deviation from the desired velocity to send feedback to that effect to the driver. This may be done advantageously by means of a visual indicator in the driver's field of view. It would be conceivable, for example, for the symbol that is present in most vehicles for operation of the velocity regulating system to begin to flash. Also conceivable are audible indicators such as a spoken announcement.

Figure 2:
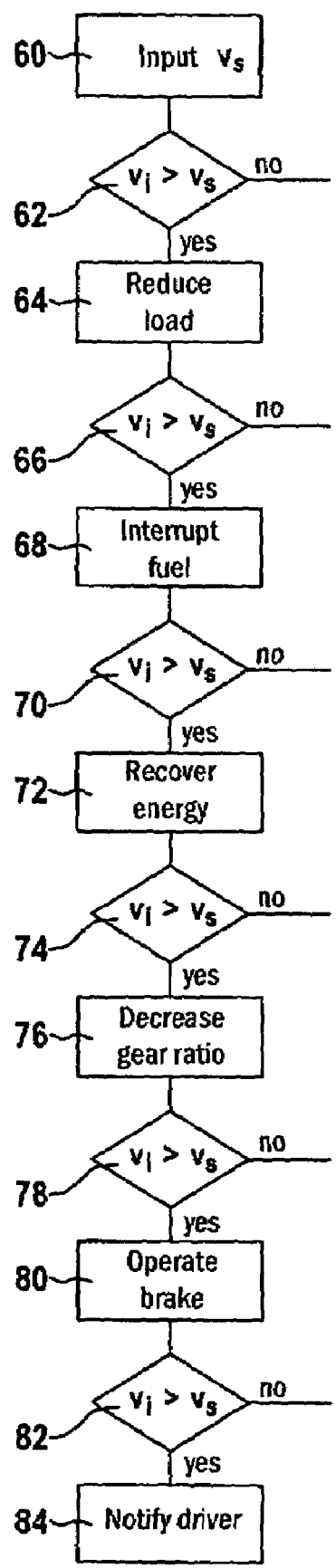
FIG. 2 shows a flow chart.

The above-mentioned sequence of utilization of the braking ability of the power train with velocity regulation active will be clarified on the basis of the flow chart in FIG. 2.

In step 60 a desired velocity $v_s$ is specified.

In step 62 it is then determined whether the actual velocity $v_l$ is greater than the desired velocity $v_s$. If so, in step 64 the load is reduced.

If it is ascertained in step 66 that this is not sufficient, in step 68 the fuel supply is interrupted. If it is ascertained in Step 70 that even this is not sufficient, in step 72 energy recouperation is activated. If even this is not sufficient (step 74), in step 76 the transmission ratio is reduced. If even that is not sufficient (step 78), in step 80 the brakes are operated.

It goes without saying that the simplified portrayal in the flow chart runs in such a way that, for example, after step 66 the process first returns to step 64, and that it does not advance to step 68 until no further reduction of the load is possible in step 64. Correspondingly, the potential for retardation present in each of the steps 64, 68, 72, and 76 is first entirely exploited before moving on to the next step. As soon as the actual velocity reaches the desired velocity, the action of the particular step initiated is withdrawn, and if the actual velocity is then still below the desired velocity, after the fuel supply is turned on again the load control element is also activated.

Since the effect of interventions 64, 68, 72, 76, 80, and 84 is measured in each case by the change of actual velocity and is thereby fed back, the method according to the present invention is a regulatory process, i.e., a control process with feedback.

An additional aspect of the invention consists in prolonging the effect of the overrun shutoff of the fuel supply when the combustion engine is running in overrun mode. The overrun shutoff is usually interrupted when the speed of the combustion engine falls below a cutoff speed, for example the idle speed of the combustion engine or a speed that is somewhat higher than the idle speed. The result of this, if the vehicle velocity for example falls below 40 kph with transmissions that are at the highest possible transmission ratio, is that the speed of the combustion engine drops below the cutoff speed and the overrun cutoff is deactivated. As a result, fuel is consumed unnecessarily.

In accordance with the regulation strategy of transmission 6 as explained at the beginning, the transmission ratio of the latter is set so that the engine runs at a predetermined desired speed which depends on the momentary vehicle velocity and the requested propulsive power. With the accelerator pedal not activated or with the combustion engine in overrun mode, the desired speed is set as low as possible.

According to the invention, when predetermined operating conditions are present the desired engine speed is increased by a predetermined amount, which depends on the operating conditions or operating parameters, such as the vehicle velocity or change of vehicle velocity.

The cutoff speed may be increased with overrun cutoff activated, for example, as long as the transmission has not yet shifted to its lowest transmission ratio with the vehicle under retardation. This ensures that the overrun cutoff remains in operation if necessary, even if the engine speed has fallen below the cutoff speed without increasing the desired speed, and the transmission has not yet shifted to its highest transmission ratio.

In an alternate or additional embodiment of the method, the increase of the desired speed remains in effect as long as a vehicle brake is in operation.

It is advantageous to withdraw the increase of the desired engine speed more quickly under an increase in the requested propulsive power, for example additional activation of the accelerator pedal, than when the activation of the brake is ended. That ensures that the overrun cutoff is deactivated more quickly when acceleration is desired.

To achieve smooth changes in the effectiveness of the overrun cutoff, it is advantageous to limit the gradients of change of the desired engine speed.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A method for controlling a vehicle power train containing a combustion engine and a continuously variable transmission, said method comprising the steps of:
   controlling the transmission ratio of the transmission and the power delivered by the combustion engine as a function of momentary vehicle velocity and requested propulsive power;
   changing the transmission ratio of the transmission in the direction of maximum transmission ratio as the actual velocity of the vehicle increases over a desired velocity;
   and decreasing the quantity of fuel fed to the engine as the power decreases further.

2. A method according to claim 1, including the step of reducing to zero the quantity of fuel fed to the engine under overrun condition.

3. A method according to claim 2, including the step of storing kinetic energy of the vehicle in an energy storage device by means of a recouperation unit positioned in the power train with the supply of fuel reduced to zero.

4. A method according to claim 3, including the step of changing the transmission ratio of the transmission in the direction of a lower transmission ratio with the supply of fuel reduced to zero.

5. A method according to claim 4, including the step of actuating a vehicle brake when the actual velocity increases and while the transmission is shifted in the direction of a lower transmission ratio.

6. A method according to claim 5, including the step of conveying to the driver an audible or visual indication if the actual velocity exceeds the desired velocity by a predetermined amount despite the transmission being shifted in the direction of a lower transmission ratio and the vehicle brake being activated.

7. A method for controlling a vehicle drive train containing a combustion engine and a continuously variable transmission, including the steps of: controlling the transmission ratio of the transmission so that the combustion engine runs at a desired speed as a function of momentary vehicle velocity and requested propulsive power, and interrupting the supply of fuel to the combustion engine if the combustion engine is running at a speed that is higher than a cutoff speed, wherein the desired speed is increased depending on predetermined operating conditions.

8. A method according to claim 7, including the step of increasing the desired engine speed when overrun cutoff is active and when the transmission is not shifted to its lowest transmission ratio.

9. A method according to claim 7, including the step of increasing the desired engine speed is increased as long as a vehicle brake is activated.

10. A method according to claim 9, wherein the increase of the desired engine speed is withdrawn more quickly when the requested propulsive power is increased than when activation of the brake is ended.

11. A method according to claim 10, wherein the amount by which the desired engine speed is raised is a function of operating parameters of the power train.

12. A method according to claim 11, wherein a gradient of change of the desired engine speed is limited.

13. A device for controlling a vehicle power train containing a combustion engine and a continuously variable transmission, said device comprising:
- a plurality of vehicle operation condition sensors for detecting at least the position of an accelerator pedal, a vehicle velocity, and a transmission setting;
- a plurality of actuators for adjusting a power setting element of the combustion engine, the transmission ratio of the transmission, and the supply of fuel to the combustion engine;
- an energy storage device for storing kinetic energy of the vehicle;
- a brake control device for activating a vehicle brake; and
- a control unit for controlling the actuators, the energy storage device, and the brake device as a function of output signals from the sensors to carry out the method according to claim 1.

* * * * *